Oct. 29, 1968

D. M WILLYOUNG 3,408,517

MULTIPLE CIRCUIT WINDING PATTERNS FOR
POLYPHASE DYNAMOELECTRIC MACHINES

Filed Feb. 23, 1966

48 SLOT
3 PHASE
2 POLE
4 CIRCUIT
5/6 PITCH

INVENTOR:
DAVID M. WILLYOUNG,

BY W. C. Crutcher

HIS ATTORNEY.

Oct. 29, 1968
D. M. WILLYOUNG
3,408,517
MULTIPLE CIRCUIT WINDING PATTERNS FOR
POLYPHASE DYNAMOELECTRIC MACHINES
Filed Feb. 23, 1966
5 Sheets-Sheet 2
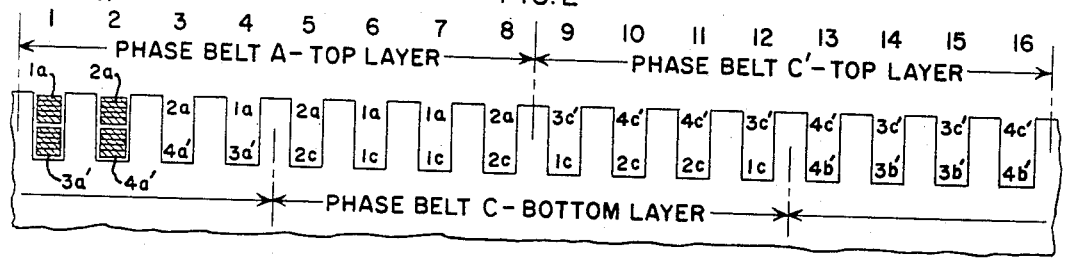
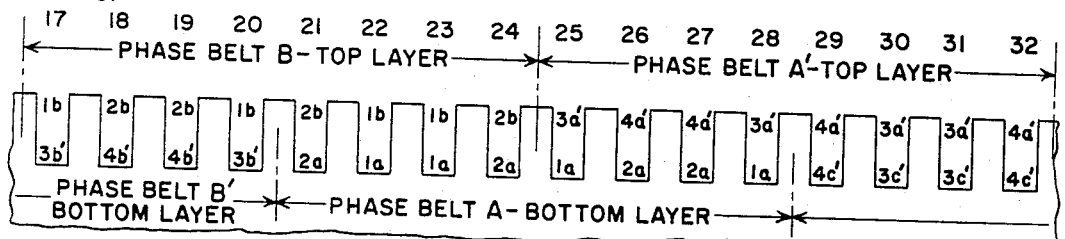
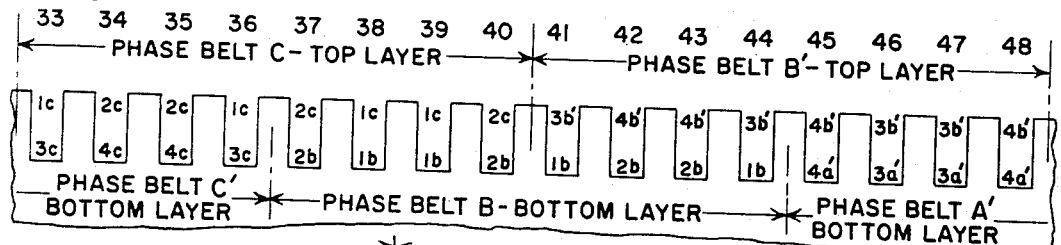
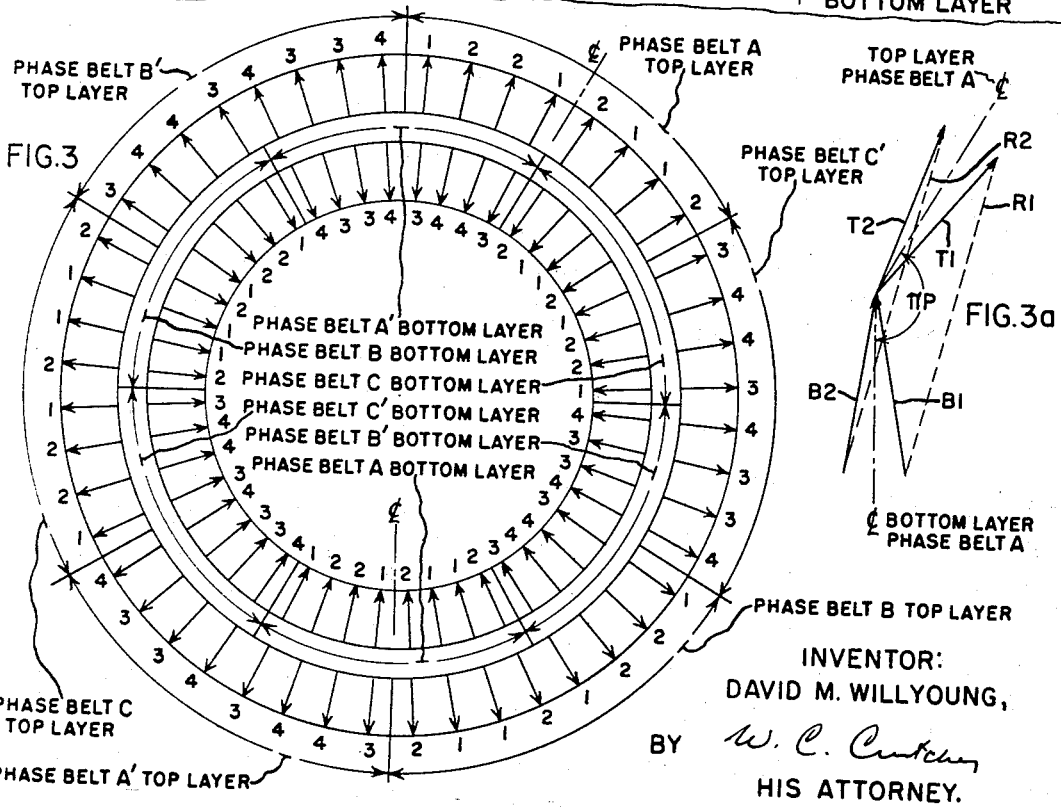
INVENTOR:
DAVID M. WILLYOUNG,
BY W. C. Crutcher
HIS ATTORNEY.

72 SLOT
3 PHASE
2 POLE
4 CIRCUIT
5/6 PITCH

54 SLOT
3 PHASE
2 POLE
3 CIRCUIT
2/3 PITCH

INVENTOR:
DAVID M. WILLYOUNG,
BY W. C. Crutcher
HIS ATTORNEY.

INVENTOR:
DAVID M. WILLYOUNG,
BY W. C. Crutcher
HIS ATTORNEY

United States Patent Office 3,408,517
Patented Oct. 29, 1968

3,408,517
MULTIPLE CIRCUIT WINDING PATTERNS FOR POLYPHASE DYNAMOELECTRIC MACHINES
David M. Willyoung, Scotia, N.Y., assignor to General Electric Company, a corporation of New York
Filed Feb. 23, 1966, Ser. No. 529,273
10 Claims. (Cl. 310—198)

ABSTRACT OF THE DISCLOSURE

In a two-layer multiple circuit polyphase winding for a dynamoelectric machine, the circuit sequence in the top layer coil sides of each phase belt is in partially or wholly interchanged relationship with the circuit sequence in the bottom layer coil sides of the same phase belt to reduce voltage unbalance between parallel connected circuits.

---

Figure 1:
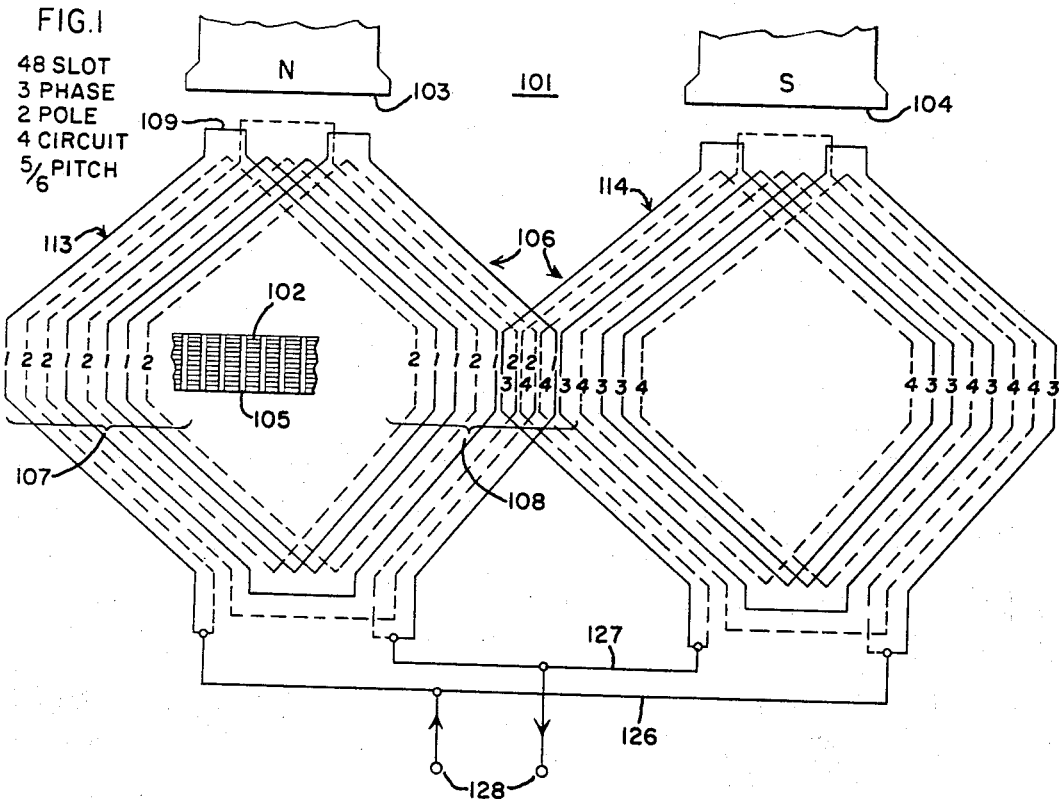

This invention relates to improved dynamoelectric machine winding patterns and more particularly to polyphase generator armature windings having two or more parallel circuits for each phase.

A conventional turbine-driven polyphase generator of large size comprises a stationary armature and a cooperating rotatable field element and may be operative to generate three-phase electric power at a frequency of 60 cycles, whereby the field element if of two pole construction is rotated at 3600 r.p.m., or if of four-pole construction is rotated at 1800 r.p.m. In the generator, the armature element or core is formed of laminations of magnetizable material and is normally provided with an elongated cylindrical opening therethrough that is bounded by a number of angularly equi-spaced winding slots in which a composite three-phase armature winding is carried. The armature winding normally includes three individual phases that are frequently connected in Y or star relation to supply the load.

Ordinarily, each phase of the armature winding includes a number of phase belts, i.e., groups of coils occupying adjacent or near-adjacent slots all carrying the same current because the coils in the phase belt are series-connected, or because other means, as described later, have been used to insure that the currents are substantially equal in phase and magnitude. Usually there is one phase belt per phase opposite each rotor pole. For example, a 3 phase 4 pole generator ordinarily employs 12 phase belts each occupying 30 mechanical degrees or 60 electrical degrees around the armature periphery.

The individual coils are normally distributed in the armature slots in a 2-layer lap winding arrangement, wherein each slot holds two coil sides with the leftmost coil side, for example, of any particular coil occupying the upper position in a slot and the rightmost coil side of the same coil occupying the lower position in an angularly displaced slot, when viewed from the same orientation relative to the coils. Since all coils ordinarily have the same pitch, the term "phase belt" is commonly applied to denote either the group of adjacent top layer coil sides carrying the same phase current or the similar group of angularly displaced bottom coil sides, or more generally is used to denote the two in combination. In the present invention, however, since the arrangement of coils in the upper and lower layers in the slots is not the same, it is necessary to distinguish between them by qualifying the more general definition, such as top layer of a phase belt or bottom layer of a phase belt.

When two coil sides of a coil are displaced by 180 electrical degrees the coil is described as "full pitch." If, as is the more usual case, the two coil sides are angularly displaced by less than 180 electrical degrees, the winding is described as a "fractional pitch" or "chorded" winding.

In the evolution of polyphase generators there has been an ever increasing demand for greater power ratings. This has required that the product of generator voltage and current increase, since power factor has remained substantially the same. There are many factors which limit the maximum level of the generator voltage, however, such as the dielectric strength of the winding insulation system, the effectiveness of the corona suppression system, and the fraction of the space in the armature slots which can be advantageously used for insulation before the ohmic losses become excessive. Consequently, whereas early generators of smaller rating in many cases utilized many winding slots containing multiturn coils and were arranged with all the phase belts of a given phase connected in series in order to obtain a sufficiently high voltage, it is now common to utilize a relatively small number of slots with one turn coils and to locate the coils of each phase belt of a given phase in the same electrical positions under each pole, so that these winding groups will generate voltages which are identical in phase and magnitude, permitting the phase belts to be connected in parallel. In this case the generator terminal current is equal to the phase belt current times the number of poles.

Since it has not been practical to increase the generator voltage in proportion to the generator rating the armature current has increased substantially. This has resulted in greatly increased electromagnetic forces on the windings (since force on a conductor increases as the square of the current for a particular geometry), and has necessitated the development of much more powerful methods for restraining motion of the armature windings in the slot armature slots (as typified by the means disclosed in U.S. Patent 3,158,170—Coggeshall et al.), and over the armature end windings (as typified by the means shown in U.S. Patent 3,089,048—Bahn et al.), both of the aforementioned patents being assigned to the assignee of the present invention. However because of the relatively low number of armature slots which are presently used in order to avoid excessive voltage, the effectiveness of these devices is limited by the number of "points of action" at which they can be applied.

Certain armature winding arrangements with more than one parallel circuit per phase belt (i.e. more than one circuit per phase per pole) have previously been developed in order to increase the rating of earlier nonconductor-cooled armature windings by reducing the thickness of the armature insulation permitting an easier flow of heat therethrough. For example U.S. Patent 2,778,962—Taylor describes a multiple circuit armature winding with four parallel circuits per phase for a three phase, 2 pole, 72 slot generator (i.e. 2 parallel circuits/phase/pole). U.S. Patent 2,778,963—Habermann and U.S. Patent 3,152,-273—Harrington show multiple circuit armature windings having three parallel circuits per phase for 3 phase, 2 poles, 72 slot constructions (i.e. 1½ circuits/phase/pole). A multiple winding construction is illustrated in U.S. Patent 2,046,992—Alger, showing two separate windings for each phase which can be connected to different external loads. All of the foregoing patents are assigned to the assignee of the present application. In these arrangements, since the total group of coils assigned to given phase under each pole are subdivided and connected in more than one series circuit (the series circuits being connected in parallel to make up the total phase winding or being connected to separate loads), the total current flowing through adjacent coils assigned to a given phase is not necessarily identical since the coils may be in different circuits and circulating currents may flow therebetween. In spite of this, the total group of coils assigned to a particular phase opposite each pole is still commonly referred to as a phase belt (or sometimes as a split phase belt).

When the coils per phase per pole are subdivided into more than one series-connected group the generated voltages in each group will differ in phase and/or magnitude, since the two circuits must necessarily occupy different electrical positions relative to the pole. An objective of all the aforementioned multiple circuit winding patents is to balance the voltage magnitude and phase angle of one circuit with respect to the other(s) as closely as possible so that the current circulating from one circuit to another is small and does not produce excessive local heating, extra losses or harmonics in the generator flux or MMF waves. Efforts to reduce this unbalance between circuits have taken the form of varying the sequence of respective circuits within each phase belt (as in the Taylor patent), or by series-connecting coils from phase belts under different poles (as in the Habermann and Harrington patents). Although these arrangements have been satisfactory in reducing circulating currents between circuits for certain numbers of stator slots, there is an inherent minimum unbalance in each arrangement which cannot be further reduced.

In general, the fewer the number of armature slots, the less likely it is that the coils of a phase belt can be subdivided into more than one circuit such that the circuits can be paralleled without substantial circulating current even when the methods of the aforementioned patents are applied. However the armature conductors of modern conductor-cooled generators are necessarily wider than non-conductor cooled coils in order to provide space for coolant passages. Consequently fewer winding slots can be employed than for non-conductor cooled windings, and winding arrangements with a large number of slots are not generally applicable for conductor cooled generators.

Accordingly, one object of the present invention is to provide an improved winding arrangement for multiple circuit polyphase generators which reduces the voltage magnitude or phase unbalance between circuits.

Another object of the invention is to provide an improved method of interconnecting coil sides among the windings of a multiple circuit polyphase generator which can be used to reduce unbalance between the paralleled circuits of each phase. A more specific object of the invention is to provide an improved winding pattern for reducing phase unbalance between parallel circuits or reducing voltage magnitude unbalance between parallel circuits or reducing both in combination.

A further object is to provide additional near-balanced multiple-circuit armature winding patterns suitable for large modern conductor-cooled generators permitting more armature coils to be used within the restrictions set by available space each carrying a reduced amount of current (and thereby experiencing reduced electromagnetic force and providing more "points of action" for support and vibration suppression devices), without correspondingly increasing the generator terminal voltage.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a schematic winding pattern for a three-phase, two-pole, 48-slot generator having four parallel circuits per phase, showing only one of the three phases.

Figure 1A:
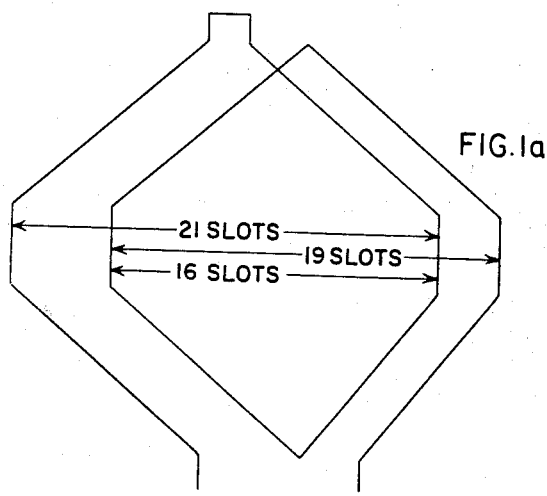
Figure 4:
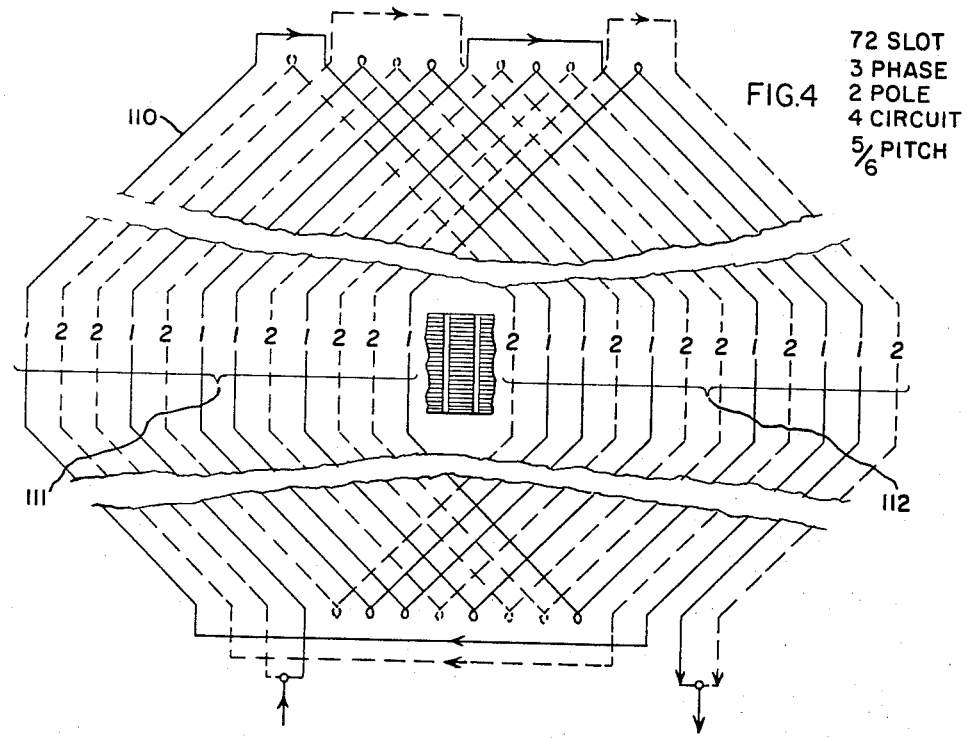
Figure 6:
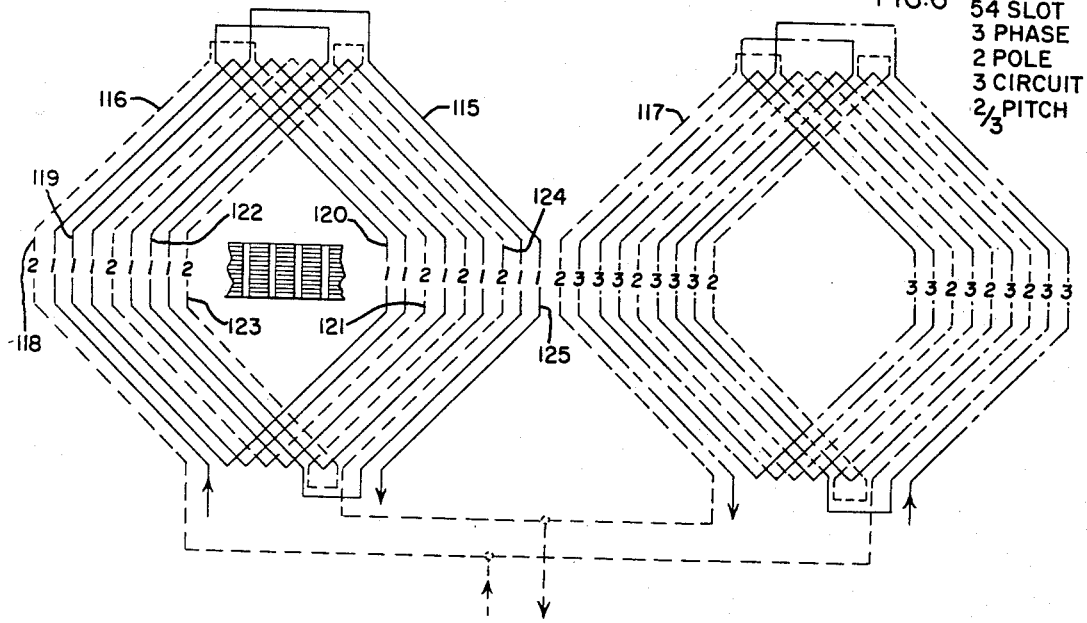
Figure 5:
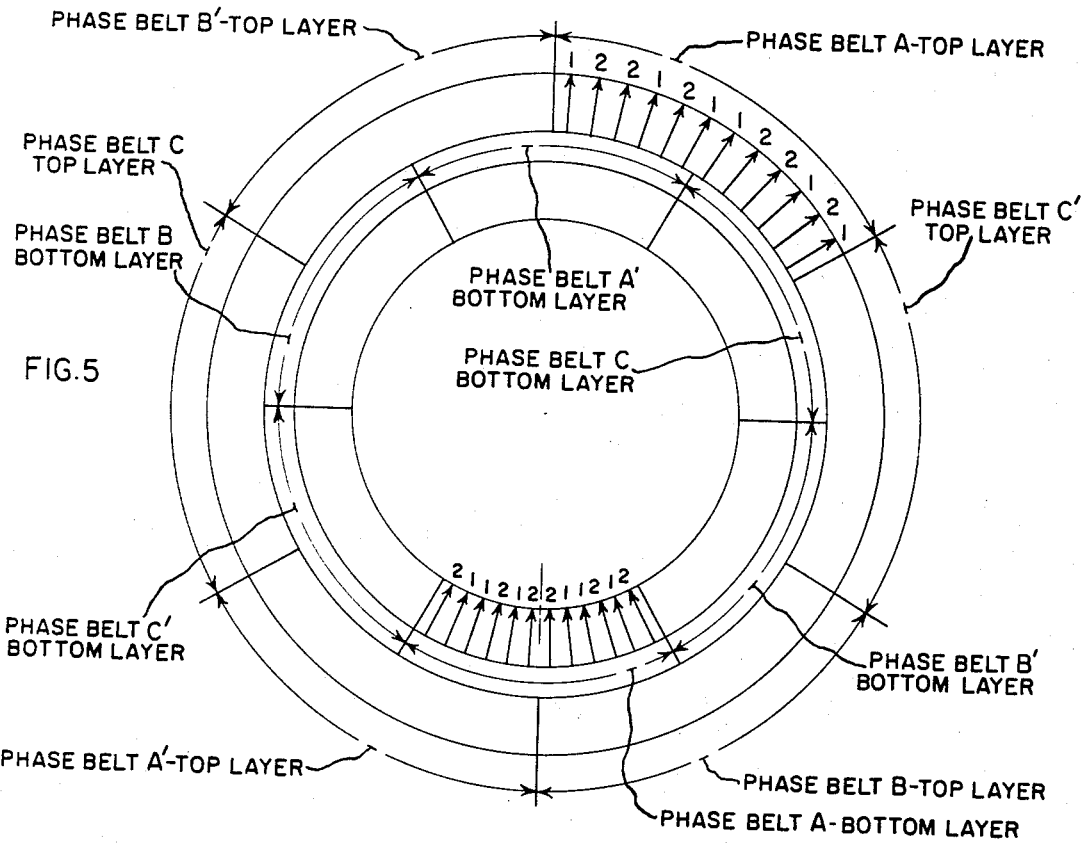
Figure 5A:
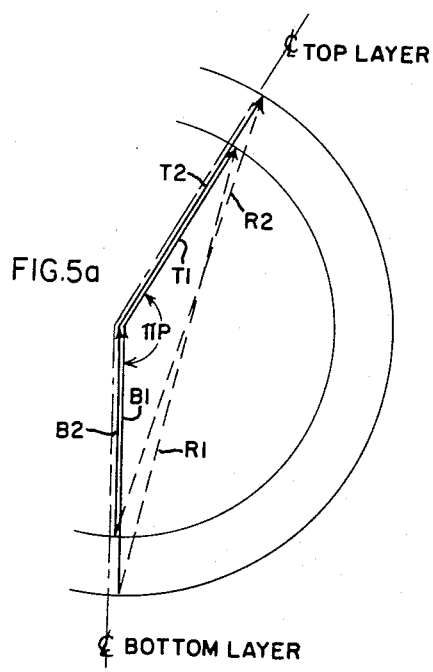
Figure 7:
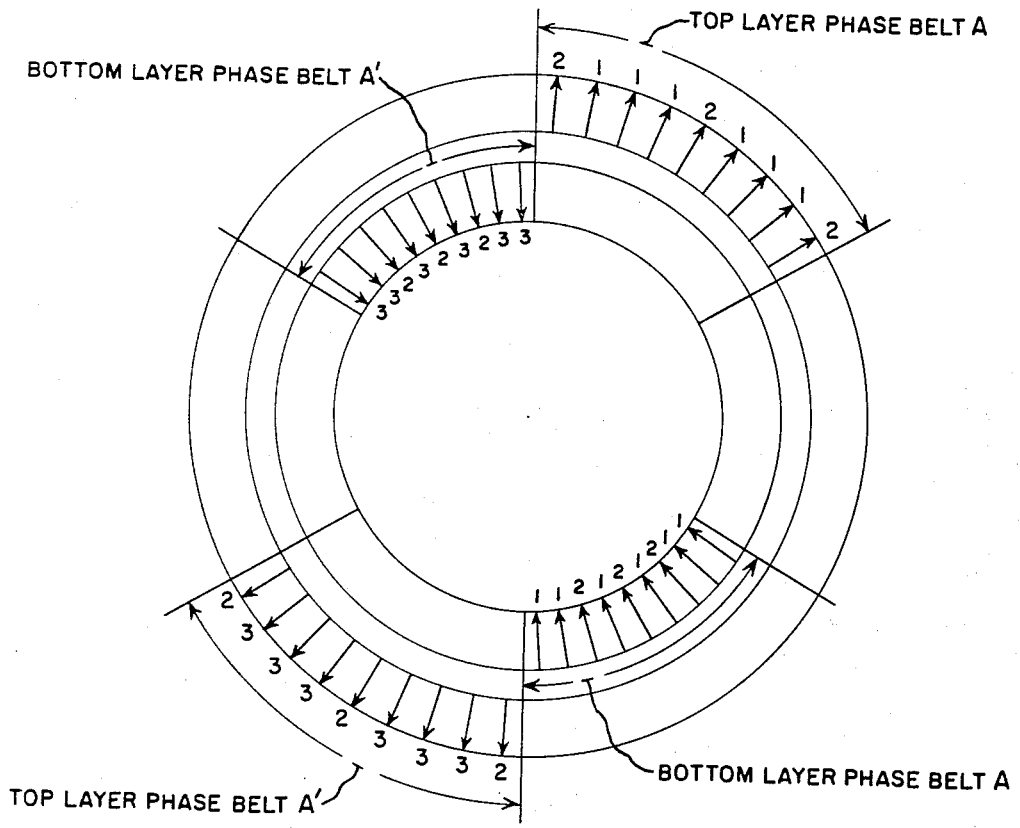
Figure 7A:
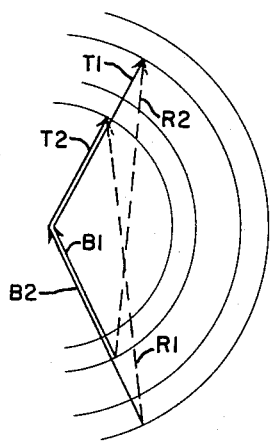

FIG. 1a is a portion of the winding taken from FIG. 1 for the first two coils of one circuit of one phase, FIG. 2 is a developed view of the slot winding pattern for all three phases of the FIG. 1 winding, FIG. 3 is a diagram for all three phases of the FIG. 1 generator, showing top and bottom layer coil side voltages in their proper phase displacement, FIG. 3a is a vector diagram for one of the positive phase belts of the FIG. 1 generator, both top and bottom layers, FIG. 4 is a schematic winding diagram for an alternate form of the invention illustrating a three-phase, two-pole, 72-slot generator with four circuits per phase, and showing only one phase winding, FIG. 5 is a diagram for some of the positive phase belts of the FIG. 4 generator winding, showing top and bottom layer coil side voltages in proper phase relationship, FIG. 5a is a vector diagram for the phase belt illustrated in FIG. 5, FIG. 6 is a winding pattern for one phase of a three-phase, two-pole, 54-slot generator having three circuits per phase, FIG. 7 is a diagram showing the top and bottom layer coil side voltages for both positive and negative phase belts of one phase of FIG. 6, and FIG. 7a is a vector diagram for the positive phase belt of FIG. 6.

Briefly stated, the invention comprises providing a lap winding for a polyphase dynamoelectric machine having more than one parallel circuit per phase for each pole, wherein the circuit sequence of the coil sides in the top layer of a phase belt is altered from that of the circuit sequence of the coil sides in the bottom layer of the same phase belt by varying the pitch of the individual coils within a circuit. This interchanges the circuit sequence of all or a portion of the coil sides within one layer of the phase belt with respect to the other layer of the phase belt and, can be employed to substantially eliminate the voltage unbalance (phase or magnitude) between the resultant voltages generated in the paralleled circuits of each phase winding.

Referring now to FIGS. 1, 1a, 2, 3 and 3a, of the drawing, there is illustrated a dynamoelectric machine 101 in the form of a turbine-driven generator, and embodying the features of one form of the present invention. Reference numerals 101 and higher are used for specific structural items, while lower numerals are used to designate circuits and vectors. Generator 101 is of the two-pole, three-phase type having four circuits per phase and comprises a stationary armature element or core 102 and a rotating field element represented by north and south poles 103, 104 respectively. The core 102 includes 48 circumferentially spaced slots 105 and a two-layer, lap winding 106 disposed in core slots 105. Winding 106 in FIG. 1 comprises only phase A of three phases A, B and C. However, since phases B and C are merely angularly shifted in the slots by 120° and 240° respectively and are identical to phase A, they are omitted from FIG. 1 for clarity. FIGS. 2 and 3 show all three phases.

In FIG. 1, the top layer coil sides 107 and the bottom layer coil sides 108 are angularly displaced from one another by less than 180 electrical degrees (150° in the particular embodiment shown) to give a fractional pitch winding. Thus, the first coil side in the top layer of the phase belt commences 20 slots, or 5/6 of the full pole pitch from the first coil side in the bottom layer.

In a normal lap winding the pitch of each individual coil would thus be 5/6, although, as it will be seen hereinafter, the pitch of the individual coils varies in the present invention and is not equal to the pitch of the coils considered as a group. This is illustrated in FIG. 1a which illustrates a duplicate of the first two coils of the winding shown in FIG. 1. There it is observed that the first coil of the phase belt has a pitch of 21 slots, while the coil to which it connects in series has a pitch of 19 slots between coil sides in the top and bottom layers.

In FIG. 1, winding 106 comprises two identical phase belts 113, 114 disposed in the same relative positions with respect to the two rotor poles 103, 104. Phase belts 113, 114 are connected in parallel by conductors 126, 127, and are arranged in opposite winding sense with respect to the mechanical pole structure 103, 104, as shown in FIG. 1, or in the same sense relative to the direction of the magnetic field associated with each pole, so that the voltages generated in phase belt windings 113, 114 are identical and act in the same sense to deliver half the total load current to the phase winding terminals 128 from each phase belt with no circulating currents therebetween. Phase belt 113 comprises two parallel circuits designated by numerals 1, 2 shown in solid lines and dashed lines respectively. Similarly phase belt 114 comprises two parallel circuits designated by numerals 3, 4. This gives a total of four paralleled circuits per phase.

In accordance with the invention, it will be observed that, contrary to the conventional lap winding pattern, wherein the pitch of each individual coil is equal to that of the remainder of the coils, the sequence of the respective circuits 1, 2 in the bottom layer coil sides 108 of phase belt 113 is in interchanged relationship with respect to the sequence for the top layer coil sides 107. This is accomplished through the appropriate use of jumpers such as 109 to shift the relative positions of coil sides in the top and bottom layers between the two circuits. Thus, the sequence of circuits 12212112 in the top layer coil sides 107 becomes 21121221 in the bottom layer coil sides 108 of the same phase belt.

FIG. 2 is a developed view of the slots showing the positions of the coil sides for the three phases and the four parallel circuits per phase. Numerals 1, 2, 3 and 4 indicate the circuit numbers; lower case letters a, b, c represent the coil sides for the three phase belts, ABC, associated with the positive pole 103; and lower case letters a', b' and c' represent the corresponding coil sides of the phase belts A', B', C' associated with the negative pole 104. For the sequence shown, if the rotor poles 103, 104 rotate from left to right (FIGURES 1 and 2) the voltages generated in the 3 phase belts associated with the positive pole, 3, will crest 120 electrical degrees apart in the order ABC. Similarly the voltages in phase belts A', B', C' will crest in the order A'B'C', with the resultant of A and A', B and B', and C and C' cresting simultaneously each 120° apart in time phase.

FIG. 3 is a diagram illustrating the time phase relationship of the coil side voltages for all three phases. The outer circle of vectors represents voltages for individual coil sides in the top layers of the various phase belts, while the inner circle of vectors represents the individual coil side voltages for the conductors in the bottom layer. Normally, only one circle of vectors would be needed for this type of diagram since the sequence of bottom layer coil sides is the same as that of top layer coil sides in a conventional lap winding. However, two rings of coil side voltage vectors are illustrated here, with the inner bottom layer vectors being reversed relative to the outer, top layer vectors to illustrate the proper additive relationship of the coil side voltage vectors for the individual coils.

FIG. 3a is a vector diagram which is not to scale and in which the relationships are exaggerated for purposes of clarity. FIG. 3a shows the relationship of the vector addition of the individual coil sides in the top and bottom layer of phase belt A for circuits 1 and 2. Therefore, FIG. 3a corresponds to the coil sides designated 107 and 108 in FIG. 1.

In the prior art, certain improvements have been suggested for arranging the circuit sequence of coil sides within a phase belt made up of two or more parallel circuits. In all of the foregoing suggestions, however, it was presupposed that the sequence in the bottom layer would be the same as the sequence in the top layer because this was the automatic result of using a lap winding. One method of such prior circuit sequence arrangement in a winding with two circuits per phase per pole, was to divide the phase belt layer in two groups on either side of a centerline. Then the sequence of circuits was made such that the sequence of coil sides in one group was the complementary mirror image (about the centerline) of the coil side circuit numbers in the other group. A simple example is found in the aforementioned Alger Patent 2,046,992 where the top layer circuit sequence was 111222. "Complementary mirror image," as used herein, means that if the sequence of circuit numbers is divided into half, such as by folding the page through the center of the sequence, a circuit number will be mirrored by a number from another or complementary circuit in the layer. For example the sequence 2122121121 forms a complementary mirror image about the centerline (between its fifth and sixth numbers).

Referring to FIGS. 3 and 3a, therefore, the circuit 1 coil side voltage vectors labeled 1 in the top layer of phase belt A (outer circle of FIG. 3) add together to give a resultant T1 in FIG. 3a, which, for this particular case, is displaced by a small phase angle in a clockwise direction relative to the centerline of the phase belt A top layer coil sides. The phase displacement in FIG. 3a is exaggerated but here amounts to 0.132°.

Correspondingly the circuit 2 coil side vectors labeled 2 in the top layer of phase belt A (outer circle of FIG. 3) add together to give a resultant T2 in FIG. 3a. Since the relative positions of the circuit 1 coil sides in the phase belt A top layer going from left to right are the same as those of circuit 2 when going from right to left, i.e. 12212112, the T2 vector resultant for circuit 2 is equal in magnitude to T1, but is displaced in phase from the centerline of the top layer by an equal but opposite amount of the phase offset for T1, i.e. 0.132° counter-clockwise. In other words, since the top layer sequence 12212112 has a complementary mirror image about its centerline, T1 is equal in magnitude to T2 but is displaced in phase in the opposite direction from the top layer centerline.

Now, according to the present invention, the bottom layer sequence of phase belt A is made different from that of the top layer sequence and utilizes a sequence selected to reduce the vector difference in the resultant voltage for circuit 1 and circuit 2 for the entire phase belt. A particularly effective sequence for this purpose has been found to be the interchanged image of the top layer; i.e. 21121221 for the 48 slot embodiment shown. The resultant of circuit 1 coil side vectors labeled 1 in the bottom layer of phase belt A (inner circle of FIG. 3) is designated B1 (FIG. 3a), while the resultant of the circuit 2 vectors in the bottom layer is labeled B2. However, due to the interchanged circuit sequence in top and bottom layers, vector B1 is offset in phase an equal and opposite amount to the phase displacement of vector T1, both with respect to the centerlines of their respective coil side phase belt layers. Vectors B2 and T2 are related in a similar way. Since the top and bottom coil sides are connected in series, vector T1 adds to vector B1 to give resultant voltage for circuit 1, phase belt A, designated R1. Similarly, T2 and B2 add vectorially to give resultant R2 for circuit 2. Resultants R1 and R2 are in phase but differ slightly in magnitude, the difference varying according to the coil pitch $p$, where $p$ is the slot displacement between top and bottom layers for the total phase belt divided by the slot displacement corresponding to 180 electrical degrees.

It will be observed that contrary to the usual situation, wherein the use of a chorded or fractional pitch winding has no bearing on the voltage unbalance between circuits in a multiple circuit winding, the unbalance between circuits 1 and 2 according to the present invention is dependent upon the pitch $p$. For a full pitch winding, where the sequence of all bottom layer coil sides is the interchanged image of the sequence for the top layer coil sides, the unbalance will be zero. However, the present winding is shown with a pitch of ⅚ since there usually are more compelling reasons to use a fractional pitch winding such as to minimize harmonics, etc.

If the winding had been built according to prior art, the bottom layer sequence would have been the same as the top layer sequence, 12212112. The vector voltage resultants for the two circuits would have been equal in magnitude and different in phase by an angle of .264°

(i.e. twice .132°), for the particular sequence used in this illustration. The per unit voltage unbalance between circuits 1 and 2, which would be 90° out of phase with the average phase position of the resultants and which would act to circulate parasitic current between circuits, would equal (2×sin 0.132°) or .00462 (i.e. .462% of the magnitude of the resultants). Despite the seemingly low value of this unbalance voltage, the circulating currents might be substantial since the impedance limiting this current flow is very low. For example, calculations on a low reactance generator with parameters typical of those for which the extra heating values given in the aforementioned Taylor, Habermann and Harrington patents apply have shown that the ohmic heating in circuit 1 and circuit 3 is increased by 23.5% for this particular circuit sequence using a prior art lap winding, while heating in circuit 2 (and circuit 4) is reduced to 79.9% of normal. It will be appreciated by those skilled in the art that the extra heating due to an unbalance in generated voltage between paralleled windings of a phase depends on the voltage unbalance magnitude, its phase relation relative to the voltage supplying load current, and on the per unit reactance level of the generator windings. For example, similar calculations of the extra heating in a higher reactance generator typical of modern conductor cooled practice using exactly the same prior art 48 slot winding show that the extra heating is only about half as much (i.e. 11.8% rather than 23.5%) due to the difference in reactance alone.

Trigonometric analysis shows that if the circuit sequence is interchanged for the top and bottom layers, according to this invention, the voltage unbalance between circuits which would exist for the prior art case (constant pitch coils) is reduced by a multiplying factor of improvement given by:

$$j \times \text{cotangent} \ (90° \times p)$$

(Here $j$ denotes that there is a 90° phase rotation while $p$ is the decimal pitch ratio as previously defined.) For a phase belt with ⅚ average pitch, this multiplier is $.268j$, i.e. the voltage unbalance is only 26.8% of the prior art situation and is related 90° in phase, making it coincident in phase angle with the resultant voltage vectors R1 and R2 as shown in FIG. 3a. Numerically 26.8% of the top layer sequence voltage unbalance of .462% is less than ⅛ of one percent (i.e. .121%). The current circulating between circuits is reduced even more than this might suggest, since the circulating current is always less when the voltage unbalance between circuits is in phase with voltage supplying load current rather than in quadrature to it. Consequently calculations show that the extra heating in circuit 1 for the FIGURE 3a case is reduced to only 1.2% (versus 23.5%) for the low reactance machine, or to only .62% (versus 11.8%) for the higher reactance generator, which is quite acceptable in the design of large generators whereas 23.5% or 11.8% is not.

It will be observed that the effect of interchanging the circuit sequence in the top and bottom phase belt layers is to reduce and shift the phase of the per unit voltage unbalance produced by the top (or bottom) phase belt layer considered alone. Therefore, the method will produce designs with the smallest circulating currents when applied to top (or bottom) phase belt layer sequences which in themselves have only a small voltage unbalance between circuits. For example, the top layer circuit sequence described in FIGURES 1, 2 and 3 (12212112) which has only .462% per unit voltage unbalance is a better choice to start with than sequence 21112221, for example, which has a per unit voltage unbalance of 7.33% in quadrature with the average direction of the two resultant voltage vectors. However, the principle involved and relative benefit from the invention would be the same. Another specific application of the form of the invention shown in FIGURES 1, 2, 3, 3a is the following winding pattern for 60 slot, 4 circuit per phase, 2 pole generators: top coil side phase belt sequence 1221122112; bottom coil side sequence interchanged to give 2112211221. The per unit voltage unbalance of the top coil side layer alone is 1.91%, but because of the bottom coil side layer is interchanged the resultant voltage unbalance is reduced to only .51% for a ⅚ pitch phase belt.

A 60 slot winding pattern with even lower voltage unbalance is the following, which utilizes interspersed phase belts: top coil side phase belt sequence 1–22121211–2; bottom coil side phase belt sequence interchanged to 2–11212122–1. In this case the blanks indicate slots' positions occupied by coil sides from adjacent phase belts, as is well known in prior art for interspersed phase belt windings. Note that the left-hand side of the top layer phase belt is the complementary mirror image of the right-hand side, and that the sequence is interchanged between top and bottom layers—the common feature of all patterns described to this point. For this interspersed 60 slot pattern the per unit voltage unbalance of one layer alone is 1.334% (quadrature), while the resultant unbalance for the two-phase belt layers is only .357% (in phase).

FIGS. 4, 5, and 5a illustrate an alternate form of the invention shown in the winding for a 3 phase, 2 pole, 72 slot generator suitable for four parallel circuits per phase. The aforementioned Taylor Patent 2,778,962 already describes a 3 phase, 2 pole, 72 slot generator with four circuits per phase wherein the voltage unbalance between circuits was less than ¼ to 1% (actually .233%) and the extra heating due to circulating current between parallel circuits for a low reactance generator was only 2.6%. While these values are already satisfactorily low for most applications, an alternate form of the present invention has also been shown for 72 slots in FIGS. 4, 5 and 5a so that the improvement that is made over prior art can be better seen by direct comparison. It will be appreciated that the same relative improvement can be obtained by using the described method for generators with other numbers of slots in which prior methods do not achieve as satisfactory a balance as in the Taylor patent.

Although the Taylor patent depicts a winding with a chorded pitch of ⅔, whereas FIG. 5 and the calculations for the present invention are based on ⅚ pitch as before, the per unit voltage unbalance for the Taylor arrangement is independent of pitch so that direct comparisons with the Taylor patent can be made.

In FIG. 4 only one phase belt of one phase is shown since the other phase belt of this phase and the phase belts for the other two phases are identical, as in the previous example. The phase belt is designated 110 and the top layer coil sides are designated 111, while the bottom layer coil sides are designated 112. Phase belt 110 has two circuits designated 1 and 2 as before. When the phase belts are connected as in FIG. 1 there will again be a total of four parallel circuits per phase. The sequence of circuits in the top layer coil sides shown in FIG. 4 is 122121121221, the same as the known sequence in the Taylor patent. However, according to the present invention, the sequence in the bottom layer coil sides is interchanged, providing the sequence 211212212112.

Referring to FIG. 5 of the drawing, the phase relationships of individual coil side voltages for top and bottom layers of phase belt A are shown. It will be observed that the circuit sequence in FIGURE 4 and the resulting vector voltages in FIG. 5 are disposed for each phase belt layer so that the sequence on one side of the centerline of the phase belt layer is the actual mirror image of the sequence on the other side of the same centerline (in contrast to the FIG. 1 embodiment where the sequences on either side of the centerline of any phase belt layer is the complementary mirror image).

Referring to FIG. 5a, the vector sum of the coil side voltages for circuit 1 in the top phase belt layer is a voltage cresting at a relative phase angle coincident with the centerline of the top layer phase belt and designated as vector T1. Similarly the coil side in circuit 2 for the top layer phase belt produce a resultant T2 which has the same phase angle as T1 but which differs in magnitude as shown in greatly exaggerated scale on FIG. 5a. The individual coil side voltages in the bottom phase belt layer for circuits 1 and 2, likewise sum to resultants which are coincident in phase with the centerline of the bottom phase belt layer, designated as B1 and B2 respectively in FIG. 5a.

It will be noted that the magnitude of vector T2 is greater than T1 in FIG. 5a, the difference being numerically equal to .233% of the average value of T1 and T2 (just as in the Taylor patent). However for the bottom layer coil side resultants, the situation is reversed with B1 being greater than B2. Since the top and bottom layers are connected in series, vectors T1, B1 add vectorially to give R1, while circuit 2 vectors T2, B2 add vectorially to give resultant R2. For this case, R1 is equal to R2 in magnitude but differs somewhat in phase.

Again, the pitch $p$ determines the total unbalance voltage between resultants R1 and R2 for circuits 1 and 2. It will be seen that if the pitch is increased until a full pitch winding is obtained, vectors R1, R2 will become equal in phase as well as magnitude and the voltage unbalance therebetween will be zero.

The trigonometric expression for the improvement factor by which the per unit voltage unbalance of the top (or bottom) layer should be multiplied is the same as the previously shown expression, i.e.

$$j \times \text{cotangent } (90° \times p)$$

For a ⅚ pitch winding, using the invention as applied to the basic layer circuit sequence of the Taylor patent, $j \times \text{cotangent } (90° \times ⅚) = 0.268j$. In other words, just as before, the voltage unbalance is reduced to 26.8% of the voltage unbalance obtained from prior art methods, if the phase belt pitch is ⅚.

To recapitulate for the two forms of the invention thus far shown, if the top layer circuit sequences are such that the resultant voltages for circuits 1 and 2 are equal in magnitude but differ in phase (FIG. 1), then interchanging the circuit sequence for the bottom layer coil sides by varying the pitch of individual coils reverses the order of phase displacements of circuits 1 and 2 in the bottom layer. Thus exact phase correspondence and substantial magnitude correspondence between circuit 1 and 2 resultant voltages can be obtained, the unbalance disappearing entirely if the winding is full pitch.

Conversely, if the circuit sequence of the top layer is such that circuit 1 and 2 coil side voltages are in phase but differ in relative magnitude (FIG. 5), then interchange of circuit sequence positions of all of the bottom layer coil sides will reverse the voltage magnitude relationship between circuits 1 and 2 for the top and bottom phase belt layers so that exact correspondence in magnitude and substantial correspondence in phase between circuit 1 and 2 voltages can be obtained. Again, the unbalance is zero if the pitch is increased to a full pitch winding. In both cases the voltage unbalance between circuits for one of the phase belt layers is modified by the same factor, $j \times \text{cotangent } (90° \times p)$, which indicates nearly a 75% reduction in unbalance voltage (and a 90° phase shift) for windings with a ⅚ phase belt pitch.

Since the effect on voltage unbalance for both of the cases just described is the same, it will be appreciated that the invention can be applied with equal effectiveness to winding arrangements in which the top layer phase belt sequence represents a combination of these two cases. For example a top layer winding sequence 12212121 in which the first 6 coil sides are in the same sequence as in FIGURE 1, but the remaining two coil sides are interchanged from their previously described order will produce top layer vector sums for the two circuits which are not equal in either phase or magnitude, since the outer four coil sides, 12—21, are of the same class as the second example (FIG. 4) and produce vector sums which are equal in phase but differ in magnitude, while the inner four coil sides, 12—21, are of the same class as the second example (FIG. 1) and produce vector sums which are equal in magnitude but unequal in phase.

By exactly interchanging the sequence of the circuits in the bottom layer phase belt to 21121212, the total voltage unbalance will again be reduced by the previously given factor, $j \times \text{cotangent } (90° \times p)$, resulting in a substantial reduction in the circulating current between circuits. It will be further appreciated that any armature winding with 2 circuits per phase per pole can be divided into parts of the first and second class as just described so that this form of the invention with interchanged circuit sequences in the top and bottom layers can be applied with substantial benefit for any circuit sequence in the top (or bottom) layer phase belt.

The usefulness of the invention is by no means limited to windings with 2 circuits per phase per pole in which the sequence of all bottom layer coil sides in the phase belt is interchanged from the top layer sequence. Also the invention is not limited to two pole generator windings but extends multipole generators with three or more phases.

FIG. 6 illustrates a winding 115 having two phase belt windings 116, 117 making up phase belts A, A' in a three-phase, two-pole dynamoelectric machine. The winding shown is illustrated for a 54 slot generator wound with a fractional pitch of only ⅔ (for purposes of clarity in the drawing) and having three parallel-connected circuits per phase. Only one phase is illutrated in FIG. 6, which is obtained by connecting phase belt windings 116, 117 as indicated.

Ciricuits 1, 2 and 3 are illustrated by like numerals and designated by full lines, dashed lines, and dot-dash lines respectively. In order to simplify the analysis, circuit 1 lies completely within phase belt A (winding 116) and circuit 3 lies completely within phase belt A' (winding 117), whereas circuit 2 consists of two identical windings, lying in both phase belts A and A'. Therefore, in order to compare circuit 1 and circuit 2 in the vector diagram of FIG. 7a, the vectors of circuit 1 are counted as half the value of those of circuit 2.

Referring now to the diagram of FIG. 7, the individual coil side vectors for the top and bottom layers of phase belts A and A' are illustrated. The vector diagram of FIG. 7a shows only the top and bottom layers of phase belt A, and also employs only one-half of the magnitude of the unit vectors for circuit 1 for reasons explained above.

Circuit 1 vectors in the top layer (FIG. 7) add vectorially to provide T1 while circuit 2 vectors add vectorially to provide T2 in FIG. 7a. Since in the top layer coil side sequence 211121112 both circuits 1 and 2 are symmetrically disposed on either side of the centerline of the group, vector resultants T1 and T2 are coincident in phase at the phase position corresponding to the centerline of the top layer phase belt. Trigonometric evaluation shows that vector T1 is 4.25% greater than T2. Complete interchange of the circuit sequence for the bottom layer coil side phase belt, as in the previous examples, cannot be carried out in this case since with 3 circuits (1½ circuits per phase per pole), there are more of the circuit 1 coil sides than circuit 2 coil sides in the top layer phase belt, and there must be the same number of coil sides of a given circuit in the top and bottom layer.

However, the pitch of only a portion of the individual coils can be varied so as to partially interchange circuit positions in the top and bottom phase belt layers to substantially balance the resultant voltage for the first and second circuit for the entire phase.

In FIG. 6, the top layer coil sides designated 118 and 119 are interchanged with respect to bottom layer coil sides 120, 121. Similarly top layer coil sides 122, 123 are interchanged with respect to bottom layer coil sides 124, 125. After this selective circuit interchange the bottom layer circuit sequence is 112121211, wherein both circuits 1 and 2 are again symmetrically disposed about the centerline of the phase belt group, but circuit 1 resultant magnitude, shown as vector B1 in FIG. 7a, is reduced relative to the magnitude of circuit 1 top layer resultant T1, while circuit 2 lower layer resultant B2 is increased relative to T2, as shown in FIG. 7a to greatly exaggerated scale and for ⅔ pitch. The voltage unbalances between circuits 1 and 2 for the resultants in each phase belt layer, therefore tend to cancel each other, and even though the top and bottom layer voltage unbalances are not exactly equal (in magnitude) and in spite of the fact that the unbalance voltages from each layer subtract vectorially rather than numerically, substantially balanced voltages between circuits is obtained by judicious selection of the circuit sequences used for the top and bottom layer phase belts. For instance, in this example, a vector T1 is in phase with and 4.25% greater than voltage T2 for the top phase belt sequence, while vector voltage B1 is 4.23% less than the circuit 2 voltage B2. However the resultant voltages R1 and R2 for the entire phase belt differ in magnitude by only ⅒ of one percent (actually .106%) with a small phase angle of .56° therebetween, if an average phase belt pitch of 23 slots is used for this 54 slot generator.

In the foregoing description for the FIG. 6 arrangement it will be recognized that the same relationships between circuits 3 and circuit 2 for phase belt A' are utilized as those described for circuits 1 and 2 for phase belt A, circuits 1, 2 and 3 being connected in parallel to provide a 3 circuit, 54 slot, 2 pole generator.

The use of the invention to interchange all or a portion of the coil sides of one layer with respect to those in the other layer can result in significant reduction in unbalance between circuits of known arrangements. The factor of improvement for the generated voltage unbalance in many cases is on the order of four to one and the factor of improvement in increased heating due to circulating currents may be several times this. For example, for a 48 slot generator with constant pitch coils and the same circuit sequence as the top layer sequence of FIG. 1, the increased heating by circulating currents is on the order of 23.5%, for a typical low reactance generator, whereas the present arrangement gives only about ¼ of the voltage unbalance between circuits and only about 1/20 of the extra heating.

The arrangement can be extended to any reasonable number of circuits or phases, the only requirement being that there is an integral number of slots per circuit or, in other words, that the product of the number of phases and the number of circuits will divide into the number of slots to give an integer. As examples of the foregoing, for 2 pole three phase machines with three parallel circuits per phase, the invention can be used in generators having 36, 45, 54, 63, 72, 81, . . . slots. Four circuit, 3 phase machines will allow use of the invention in generators having 36, 48, 60, 72, 84, . . . slots. Five circuit, 3 phase machines can be built for generators having 45, 60, 75, . . . slots, while 3 phase, 6 circuit machines will apply to generators having 54, 72, . . . slots. All the combinations are not shown, but only a representative number for generators of practical configuration. In all of the foregoing arrangements, interchanging a selected portion or all of the top layer coil sides with bottom layer coil sides can be used to substantially reduce the magnitude or phase unbalance between circuits. The use of multiple circuit patterns similar to those disclosed will reduce armature bar forces and insulation requirements which would otherwise make the very large polyphase dynamoelectric machines impractical.

While there have been shown three alternative forms of the invention, and several specific examples have been described in detail, other modifications will occur to those skilled in the art. It is of course intended to cover by the appended claims all such modifications as fall within the true spirit and scope of the invention.

What I claim as new and desire to secure by Letters Patent of the United States is:

1. In a dynamoelectric machine, a polyphase two-layer winding, each phase of the winding having phase belts containing a plurality of parallel-connected circuits, each circuit comprising a plurality of series-connected coils having coil sides in a top layer and coil sides in a bottom layer of the winding, at least a portion of the bottom layer coil sides in a phase belt being in interchanged circuit relationship with the top layer coil sides in the same phase belt.

2. In a dynamoelectric machine having winding slots, a polyphase two-layer winding, each phase of the winding having phase belts containing a plurality of parallel-connected circuits, each circuit comprising a plurality of series-connected coils having coil sides in a top layer and coil sides in a bottom layer, the top layer coil sides of a phase belt being arranged in a group of slots in a first circuit sequence selected to reduce voltage unbalance between circuits, at least a portion of the bottom layer coil sides of one circuit being interchanged with bottom layer coil sides of another circuit in the same phase belt to give a second circuit sequence in the bottom layer which is selected to further reduce voltage unbalance between circuits.

3. The combination according to claim 2 wherein said first circuit sequence is such that the circuit numbers on one side of the centerline of the top layer slot group bear a complementary mirror image to the circuit numbers on the other side of the centerline of the slot group, whereby the vector sums of the respective top layer circuit voltages differ only in phase displacement, and wherein the numbers of said second circuit sequence are all in interchanged relationship with respect to the numbers of the first circuit sequence, whereby the phase displacement between the botom layer circuit voltages is opposite that of the top layer.

4. The combination according to claim 2 wherein said first circuit sequence is such that the circuit numbers on one side of the centerline of the top layer slot group bear an actual mirror image to the circuit numbers on the other side of the centerline of the slot group, whereby the vector sums of the respective top layer circuit voltages differ only in magnitude, and wherein the numbers of said second circuit sequence are all in interchanged relationship with respect to the numbers of the first circuit sequence, whereby the relative magnitudes of the bottom layer circuit voltages are reversed from those of the respective top layer circuit voltages.

5. The combination according to claim 2 wherein the number of winding slots is 48, the first circuit sequence in the top layer of the selected phase belt is 12212112 and the second circuit sequence in the bottom layer is 21121221, the remaining phase belts being similarly wound.

6. The combination according to claim 2 wherein the number of winding slots is 60, the first circuit sequence in the top layer of the selected phase belt is 1221122112 and the second circuit sequence in the bottom layer is 2112211221, the remaining phase belts being similarly wound.

7. The combination according to claim 2 wherein the number of winding slots is 60, the first circuit sequence in the top layer of the selected phase belt is 1–22121211–2 and the second circuit sequence in the bottom layer is 2–11212122–1, the remaining phase belts being similarly wound.

8. The combination according to claim 2 wherein the number of winding slots is 72, the first circuit sequence in the top layer of the selected phase belt is 122121121221 and the second circuit sequence in the bottom layer is 211212212112, the remaining phase belts being similarly wound.

9. The combination according to claim 2 wherein the number of winding slots is 48, the first circuit sequence in the top layer of the selected phase belt is 12212121 and the second circuit sequence in the bottom layer is 21121212, the remaining phase belts being similarly wound.

10. The combination according to claim 2 wherein the number of winding slots is 54, the first circuit sequence in the top layer of the selected phase belt is 211121112 and the second circuit sequence in the bottom layer is 112121211, the remaining phase belts being similarly wound.

References Cited

UNITED STATES PATENTS

| | | | |
|---|---|---|---|
| 2,015,562 | 9/1935 | Kilgore | 310—202 |
| 2,745,029 | 5/1956 | McElligott | 310—202 |
| 2,778,962 | 1/1957 | Taylor | 310—202 |
| 2,778,963 | 1/1957 | Habermann | 310—202 |
| 3,152,273 | 10/1964 | Harrington | 310—198 |
| 3,201,627 | 8/1965 | Harrington | 310—198 |

MILTON O. HIRSHFIELD, *Primary Examiner.*

W. E. RAY, *Assistant Examiner.*